United States Patent
Giuliano (10) Patent No.: US 12,215,938 B2
(45) Date of Patent: Feb. 4, 2025

(54) HEAT EXCHANGER MOUNT WITH INTERNAL FLOW PASSAGE

(71) Applicant: Hamilton Sundstrand Corporation, Charlotte, NC (US)

(72) Inventor: John Giuliano, North Granby, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 220 days.

(21) Appl. No.: 18/088,177

(22) Filed: Dec. 23, 2022

(65) Prior Publication Data
US 2024/0210125 A1   Jun. 27, 2024

(51) Int. Cl.
F28F 9/02   (2006.01)
B33Y 80/00   (2015.01)
F28F 9/00   (2006.01)

(52) U.S. Cl.
CPC ............ F28F 9/02 (2013.01); B33Y 80/00 (2014.12); *F28F 9/002* (2013.01); *F28F 2275/12* (2013.01); *F28F 2275/20* (2013.01); *F28F 2280/06* (2013.01)

(58) Field of Classification Search
CPC .......... F28F 9/02; F28F 9/002; F28F 2280/06; F28F 2275/12; F28F 2275/20; F28F 2210/02
USPC .................................................. 165/175, 178
See application file for complete search history.

(56) References Cited

U.S. PATENT DOCUMENTS

| 6,099,373 | A * | 8/2000 | Fernstrum | F28F 9/02 165/44 |
|---|---|---|---|---|
| 10,495,384 | B2 | 12/2019 | Rock et al. | |
| 10,736,236 | B2 | 8/2020 | Engelhardt et al. | |
| 10,809,007 | B2 | 10/2020 | Martinez et al. | |
| 11,236,674 | B2 | 2/2022 | Caimano et al. | |
| 11,414,202 | B2 | 8/2022 | Tomescu et al. | |
| 2020/0284516 | A1 | 9/2020 | Becene et al. | |
| 2020/0284532 | A1 | 9/2020 | Becene et al. | |
| 2021/0071964 | A1 | 3/2021 | Ruiz et al. | |
| 2021/0154779 | A1 * | 5/2021 | Norman | F28F 7/02 |
| 2021/0156624 | A1 * | 5/2021 | de Bock | F28F 13/08 |

FOREIGN PATENT DOCUMENTS

EP    3825638 A1   5/2021

OTHER PUBLICATIONS

Extended European Search Report for European Patent Application No. 23220379.4, dated May 28, 2024, six pages.

* cited by examiner

*Primary Examiner* — Joel M Attey
(74) *Attorney, Agent, or Firm* — Kinney & Lange, P.A.

(57) ABSTRACT

A heat exchanger includes a first header including a fluid inlet and a second header positioned downstream of the first header with respect to a first flow path of a first fluid and including a fluid outlet. The heat exchanger further includes a core extending from the first header to the second header and a mount structure extending between the first header and the second header. The core includes a plurality of core tubes. The mount structure is integrally formed with a subset group of diverted tubes of the plurality of core tubes and includes one or more internal flow passages that are connected to the subset group of diverted tubes such that the one or more internal flow passages are in flow communication with the first header and the second header in parallel to a non-diverted portion of the core.

20 Claims, 11 Drawing Sheets

HEAT EXCHANGER MOUNT WITH INTERNAL FLOW PASSAGE

BACKGROUND

The present disclosure relates generally to heat exchangers, and more specifically to heat exchanger mount structures.

Heat exchangers are used in many industries for a variety of applications. In mobile applications, particularly for aerospace applications, heat exchangers may be used to provide compact, low-weight, and highly-effective means of exchanging heat from a hot fluid to a cold fluid. Heat exchangers may also operate in high temperature environments, for example, in modern aircraft engines, and thus may be exposed to high thermal stresses. Additive manufacturing techniques can be utilized to manufacture heat exchangers layer by layer to obtain a variety of complex heat exchanger geometries.

SUMMARY

In one example, a heat exchanger includes a first header including a fluid inlet and a second header positioned downstream of the first header with respect to a first flow path of a first fluid and including a fluid outlet. The heat exchanger further includes a core extending from the first header to the second header and a mount structure extending between the first header and the second header. The core includes a plurality of core tubes. The mount structure is integrally formed with a subset group of diverted tubes of the plurality of core tubes and includes one or more internal flow passages that are connected to the subset group of diverted tubes such that the one or more internal flow passages are in flow communication with the first header and the second header in parallel to a non-diverted portion of the core.

In another example, a heat exchanger includes a first header including a fluid inlet and a second header positioned downstream of the first header with respect to a first flow path of a first fluid and including a fluid outlet. The heat exchanger further includes a core extending from the first header to the second header and a mount structure positioned adjacent to the core. The core includes a plurality of core tubes. The mount structure is integrally formed with a subset group of diverted tubes of the plurality of core tubes and includes one or more internal flow passages that are connected to the subset group of diverted tubes such that the first flow path is diverted through the one or more internal flow passages of the mount structure.

In another example, a heat exchange system includes a heat exchanger and an external mount. The heat exchanger includes a first header including a fluid inlet and a second header positioned downstream of the first header with respect to a first flow path of a first fluid and including a fluid outlet. The heat exchanger further includes a core extending between the first header and the second header and a mount structure. The core includes a plurality of core tubes. The mount structure is integrally formed with a subset group of diverted tubes of the plurality of core tubes and includes one or more internal flow passages that are connected to the subset group of diverted tubes such that the one or more internal flow passages are in flow communication with the first header and the second header in parallel to a non-diverted portion of the core. The external mount is positioned along a second flow path of a second fluid and attached to the mount structure of the heat exchanger such that that heat exchanger is mounted in a crossflow arrangement with respect to the second flow path.

DETAILED DESCRIPTION

Heat exchangers that operate in certain environments, such as in modern aircraft engines, can have reduced service lives due to fatigue caused by cyclic loading conditions while in operation and/or fatigue caused during manufacture. For example, components of heat exchangers can be subjected to high cycle fatigue (HCF) and low cycle fatigue (LCF). Fatigue can be caused by vibrational stress and/or thermal stress experienced by the component. Thermal stress can be either steady state or transient. Steady state thermal stress is due to a substantially constant difference in temperature over time. Transient thermal stress is due to a sudden or periodic change in temperature that the component experiences.

Additively manufactured heat exchangers with fractal headers are often designed to operate to stringent HCF or vibrational load and LCF or thermal load conditions. Because the core of a fractal heat exchanger consists of numerous flexible heat-exchanging members, additional mounts to external structures are often required to meet HCF requirements. These mounts that are driven by HCF requirements can be detrimental to LCF performance due to the thermal gradient between the mount material and the heat transfer surface of the heat exchanger. As heat exchangers are pushed to tolerate larger thermal gradients over shorter durations, the transient thermal stresses tend to increase. The highest stress is generally experienced at the attachment between the mount and the heat exchanger core with traditional mounts that are only directly exposed to external flow being connected to heat exchangers that have internal flow.

As described herein, a heat exchanger mount structure includes one or more internal flow passages, such that fluid flowing through the heat exchanger passes through the mount. The mount structure including the one or more internal flow passages maintains a more uniform temperature with the rest of the heat exchanger and can therefore meet vibrational and thermal load requirements for additively manufactured fractal heat exchangers. Heat exchangers including mount structures with internal flow passages according to techniques of this disclosure are described below with reference to FIGS. 1-6B.

Figure 1:
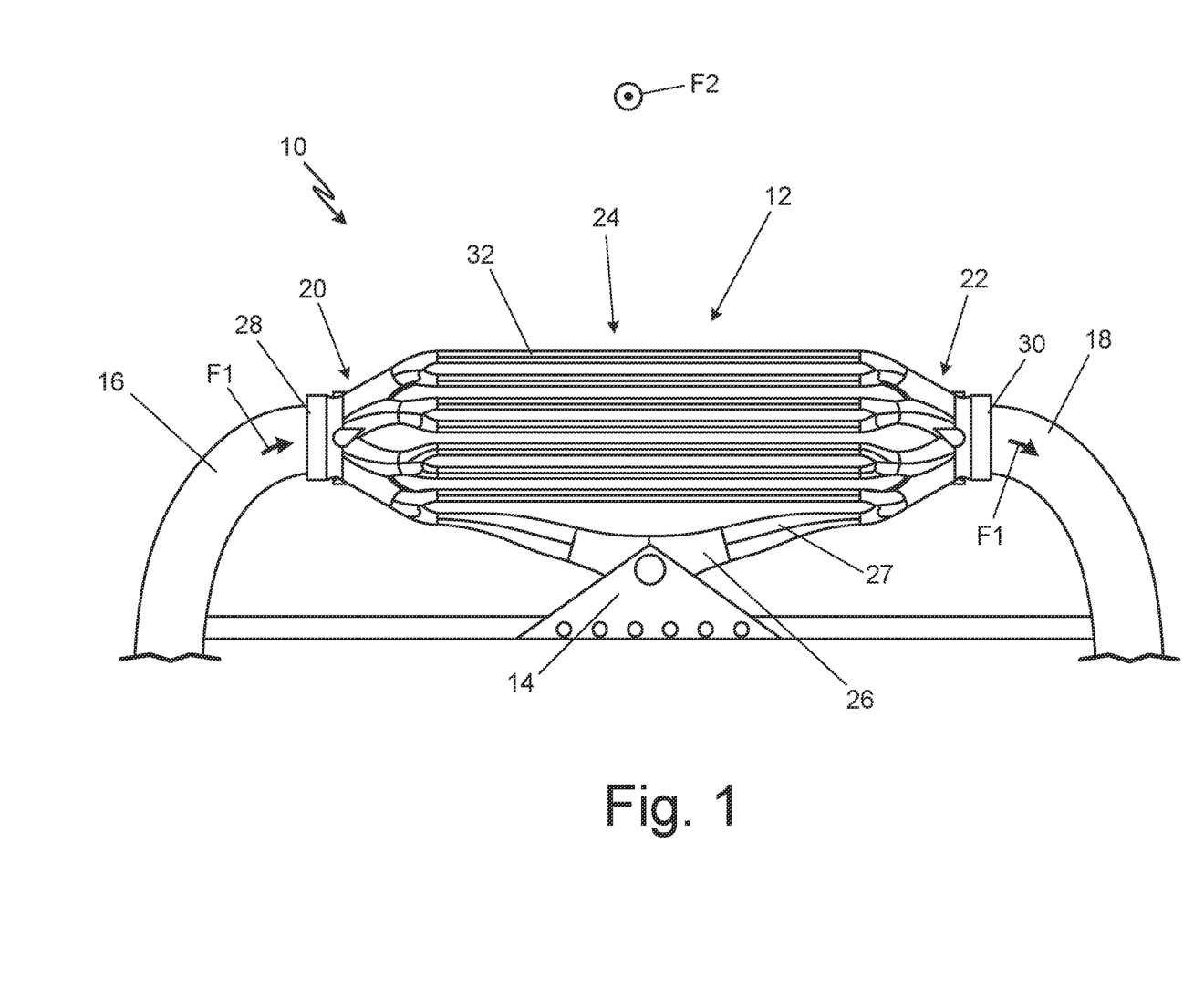
FIG. 1 is a schematic diagram illustrating a heat exchanger mounted in a heat exchange system.
Figure 2:
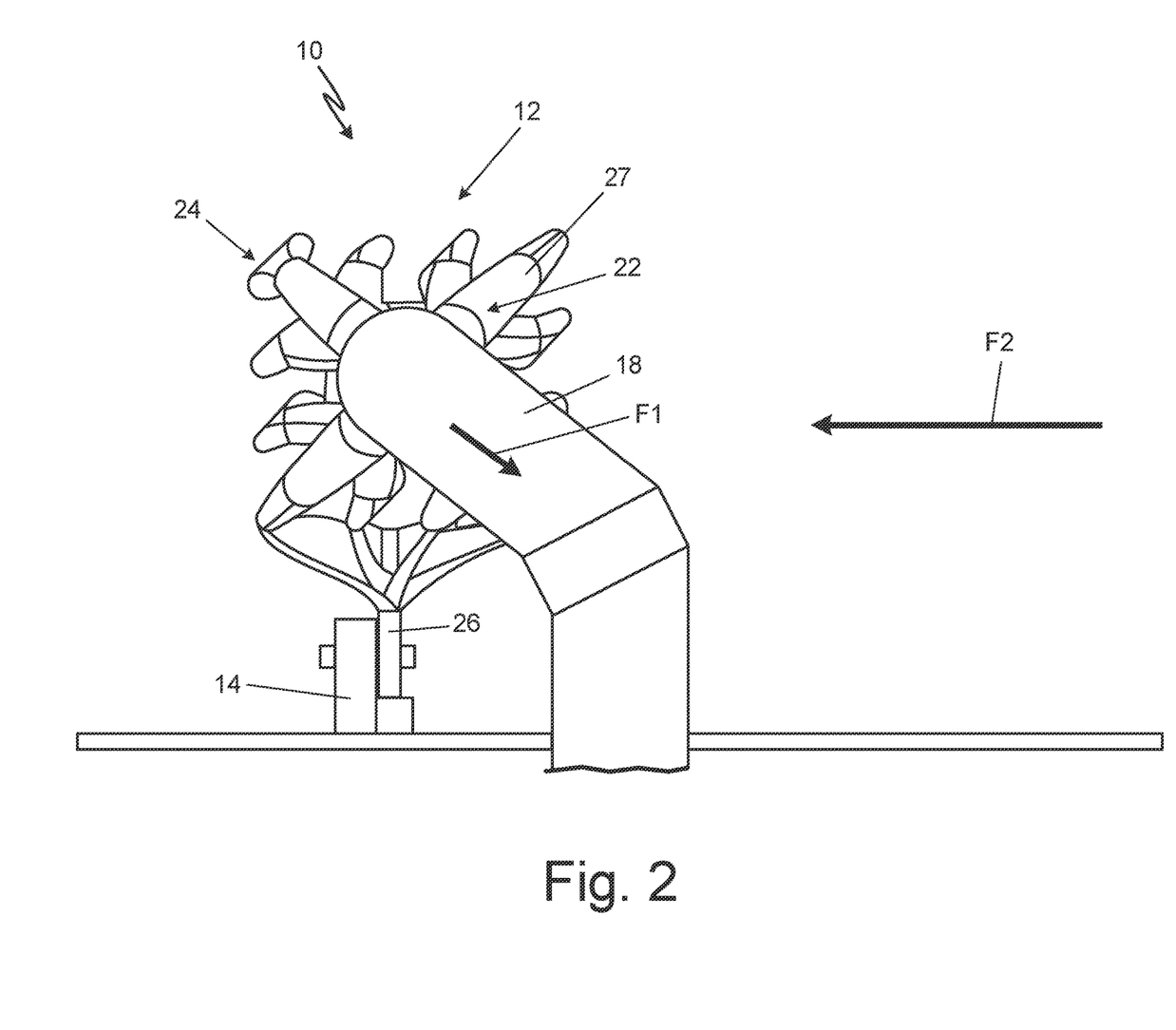
FIG. 2 is a schematic diagram illustrating fluid flow in the heat exchange system of FIG. 1.

FIG. 1 is a schematic diagram illustrating heat exchanger 12 mounted in heat exchange system 10. FIG. 2 is a schematic diagram illustrating fluid flow in heat exchange system 10. FIGS. 1-2 will be described together. FIGS. 1-2 show heat exchange system 10, including heat exchanger 12, external mount 14, first duct 16, and second duct 18. Heat exchanger 12 includes first header 20, second header 22, core 24, mount structure 26, and exterior surface 27. First header 20 includes fluid inlet 28, and second header 22 includes fluid outlet 30. Core 24 includes core tubes 32. FIGS. 1-2 also show internal fluid flow path F1 and external fluid flow path F2 (shown in FIG. 2).

Heat exchange system 10 includes heat exchanger 12 connected between first duct 16 and second duct 18. In some examples, heat exchange system 10 can be on an aircraft, such as part of an aircraft environmental control system or other aircraft system. In other examples, heat exchange system 10 can be used in any implementation for exchanging heat between fluids. As illustrated in FIG. 1, heat exchanger 12 is attached to external mount 14 between first duct 16 and second duct 18. External mount 14 is an attachment portion of a structure that is external to heat exchanger 12. External mount 14 can take many different forms, such as a flange, a bracket, etc. suitable for attaching to heat exchanger 12. For example, external mount 14 can be part of or extend from a flange or lip of an aircraft engine wall.

First duct 16 and second duct 18 are pipes, tubes, or other passageways for containing fluid flowing into or out of heat exchanger 12. First duct 16 connects to a first end of heat exchanger 12, and second duct 18 connects to a second end of heat exchanger 12. As illustrated in FIG. 1, heat exchanger 12 forms a relatively straight path between first duct 16 and second duct 18 such that first duct 16 and second duct 18 are on opposite ends of heat exchanger 12. In other examples, heat exchanger 12 could form a curved path between ducts in any orientation with respect to one another.

Heat exchanger 12 is connected to first duct 16 at first header 20. More specifically, first duct 16 is connected to fluid inlet 28 of first header 20. Fluid inlet 28 includes a first opening into the flow passages of heat exchanger 12. Heat exchanger 12 is similarly connected to second duct 18 at fluid outlet 30 of second header 22. Fluid outlet 30 includes a second opening into the flow passages of heat exchanger 12. As illustrated in FIG. 1, each of first header 20 and second header 22 can be a branched or fractal header. That is, first header 20 and/or second header 22 can include a consecutively branching tubular structure that terminates in individual tubes that are continuous with corresponding individual core tubes 32 of core 24. In the example shown in FIG. 1, first header 20 and second header 22 have mirrored branching structures having the same number and arrangement of sequential branches; however, it should be understood that other examples can include first header 20 and second header 22 with different respective branching structures. In yet other examples, first header 20 can be any suitable type of header for directing fluid from first duct 16 into core 24 of heat exchanger 12, and second header 22 can be any suitable type of header for directing fluid from core 24 into second duct 18.

Core 24 of heat exchanger 12 extends from first header 20 to second header 22. Core 24 includes core tubes 32. Each of core tubes 32 is an individual tube through which fluid can flow. Moreover, each of core tubes 32 is connected to a corresponding individual tube of first header 20 at one end and to a corresponding individual tube of second header 22 at an opposite end. Core tubes 32 are spaced apart from adjacent tubes. Although not shown in FIG. 1, core 24 can also include supports between ones of core tubes 32. Core 24 can form an overall straight path between first header 20 and second header 22 (e.g., as shown in FIG. 1) or can be curved or split into different portions, depending on the space (i.e., envelope) in which heat exchanger 12 will be mounted.

Mount structure 26 is a structural portion of heat exchanger 12 for attaching heat exchanger 12 to external mount 14. Mount structure 26 extends between first header 20 and second header 22. Mount structure 26 is generally adjacent to core 24 along a side of heat exchanger 12. Mount structure 26 can include mating features for connecting to external mount 14. Mount structure 26 is configured to have adequate structural integrity for accommodating vibrational loads on heat exchanger 12. For example, external mount 14 may be connected to or part of an aircraft engine. In such examples, mount structure 26 of heat exchanger 12 can experience vibrations from the aircraft engine due to its attachment to external mount 14. When heat exchanger 12 is mounted in heat exchange system 10, mount structure 26 supports heat exchanger 12 in a desired position for connecting between first duct 16 and second duct 18. As will be described in greater detail below, mount structure 26 can be connected to and integrally formed with ones of core tubes 32.

Heat exchange system 10 includes two flow paths: internal fluid flow path F1 and external fluid flow path F2. In general, internal fluid flow path F1 is formed by a series of continuous passages through first duct 16, heat exchanger 12, and second duct 18. External fluid flow path F2 surrounds and passes around components of heat exchanger 12. As illustrated in FIGS. 1-2, heat exchange system 10 is configured such that a first fluid flows along internal fluid flow path F1 and a second fluid flows along external fluid flow path F2 in a crossflow arrangement. That is, internal fluid flow path F1 is generally perpendicular to external fluid flow path F2. Alternatively, heat exchange system 10 could be configured such that internal fluid flow path F1 and external fluid flow path F2 are counter-parallel and the first and second fluids would interact in a counterflow arrangement.

Heat exchanger 12 is configured to permit the transfer of heat between the first fluid flowing along internal fluid flow path F1 and the second fluid flowing along external fluid flow path F2. The first and second fluids can be any type of fluids, including air, water, lubricant, fuel, or another fluid. Moreover, the first and second fluids can be the same or different types of fluids. The first fluid and the second fluid can have different temperatures. Heat exchanger 12 is generally described herein as providing heat transfer from the first fluid to the second fluid; therefore, the first fluid can be at a greater temperature than the second fluid at the point where the first fluid enters heat exchanger 12. In one example, the first fluid can be around 1,000° F. and the second fluid can be around 100° F. or an order of magnitude lower. However, other heat exchange configurations of heat exchange system 10 can include the second fluid at a greater temperature than the first fluid. Additionally, in the example shown in FIGS. 1-2, heat exchanger 12 is shown receiving the first fluid along internal fluid flow path F1 at fluid inlet 28 of first header 20. That is, first header 20 can be a relatively upstream header with respect to second header 22 along internal fluid flow path F1, and second header 22 can be a relatively downstream header. In other examples, the direction of flow of the first fluid can be reversed along internal fluid flow path F1 such that the first fluid exits rather than enters heat exchanger 12 at fluid inlet 28.

In operation, the first fluid flows along an initial segment of internal fluid flow path F1 through first duct 16 and enters heat exchanger 12 at fluid inlet 28 of first header 20. The first fluid flows along an intermediate segment of internal fluid flow path F1 through the branching tubular structure of first header 20 into core tubes 32 of core 24 and—from there—into the branching tubular structure of second header 22. Branches of internal fluid flow path F1 are diverted via ones of core tubes 32 through mount structure 26 so that some of the first fluid passes through an internal flow passage of mount structure 26, as will be described in greater detail below. The first fluid flows downstream into second header 22 from core tubes 32 and is discharged from second header 22 at fluid outlet 30. The first fluid flows along a final segment of internal fluid flow path F1 within second duct 18. Alternatively, the flow direction of the first fluid along internal fluid flow path F1 can be reversed. Exterior surface 27 of heat exchanger 12 is exposed to the second fluid as it flows along external fluid flow path F2, as shown in FIG. 2. Heat transfer between the first fluid and the second fluid can occur at first header 20, second header 22, core 24, and/or mount structure 26 as the first fluid flows through heat exchanger 12 along internal fluid flow path F1 and the second fluid contacts exterior surface 27 as it flows along external fluid flow path F2.

Heat exchanger 12 and its component parts (e.g., first header 20, second header 22, core 24, and mount structure 26) can be integrally formed partially or entirely by additive manufacturing. For metal components (e.g., nickel-based superalloys, aluminum, titanium, etc.) exemplary additive manufacturing processes include powder bed fusion techniques such as direct metal laser sintering (DMLS), laser net shape manufacturing (LNSM), electron beam manufacturing (EBM), to name a few, non-limiting examples. For polymer or plastic components, stereolithography (SLA) can be used. Additive manufacturing is useful for obtaining unique geometries and for reducing the need for welds or other attachments (e.g., between a header and core). However, it should be understood that other suitable manufacturing and/or post-manufacture machining techniques can also be used.

During an additive manufacturing process, heat exchanger 12 can be formed layer by layer to achieve varied dimensions (e.g., cross-sectional area, wall thicknesses, curvature, etc.) and complex internal passages and/or components, such as the internal flow passage of mount structure 26. Each additively manufactured layer creates a new horizontal build plane to which a subsequent layer of heat exchanger 12 is fused. That is, the build plane for the additive manufacturing process remains horizontal but shifts vertically by defined increments (e.g., one micrometer, one hundredth of a millimeter, one tenth of a millimeter, a millimeter, or other distances) as manufacturing proceeds. Therefore, heat exchanger 12, including mount structure 26, can be additively manufactured as a single, monolithic unit or part. The integral formation of heat exchanger 12 with mount structure 26 by additive manufacturing allows for the consolidation of parts and can reduce or eliminate the need for any post-process machining that is typically required with traditionally manufactured components. FIGS. 1-6B show heat exchangers 12, 112, 212, and 312 fully manufactured.

Figure 4A:
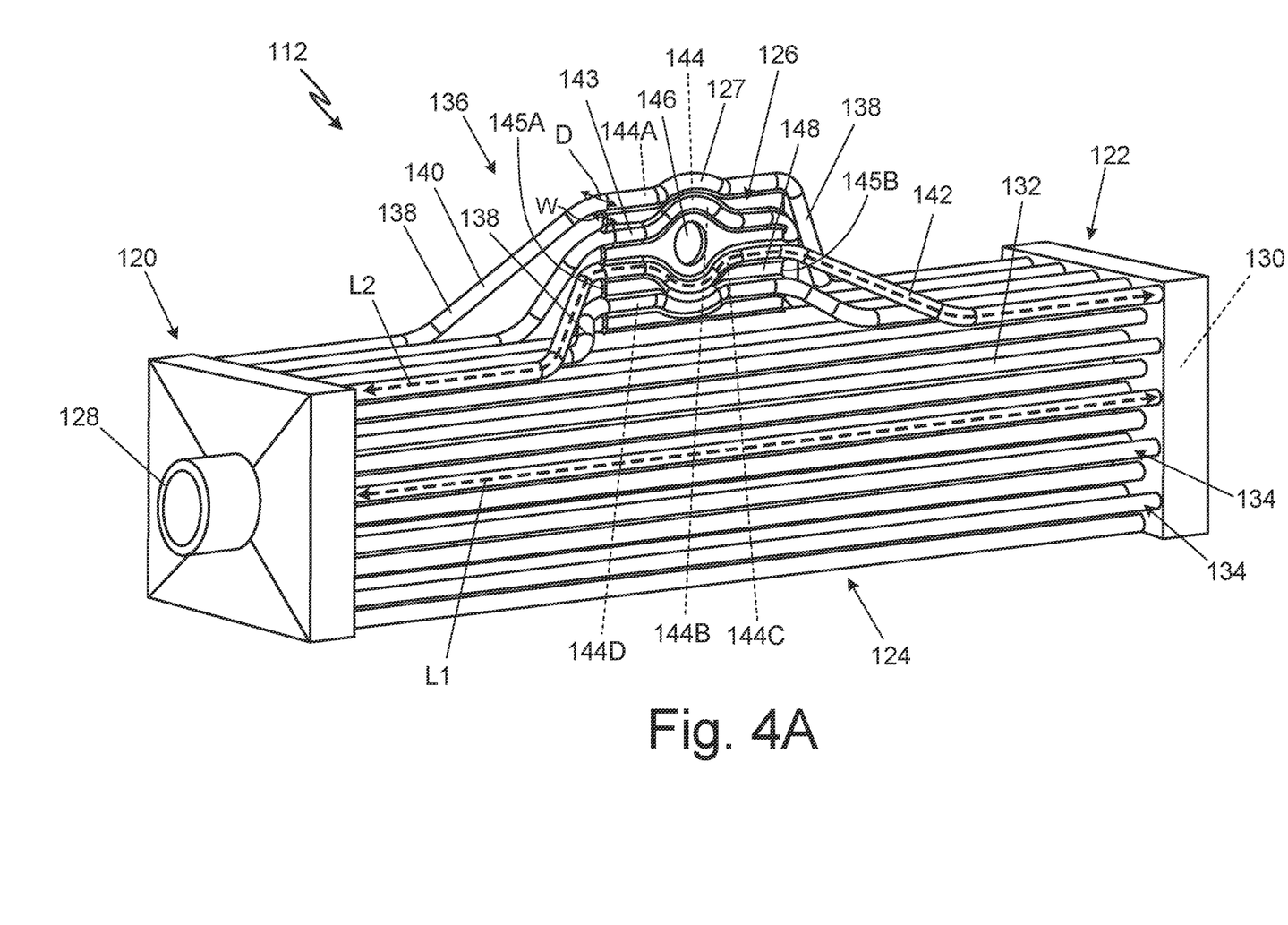
FIG. 4A is an isometric view of a second example of a heat exchanger including a mount structure with multiple internal flow passages.
Figure 4B:
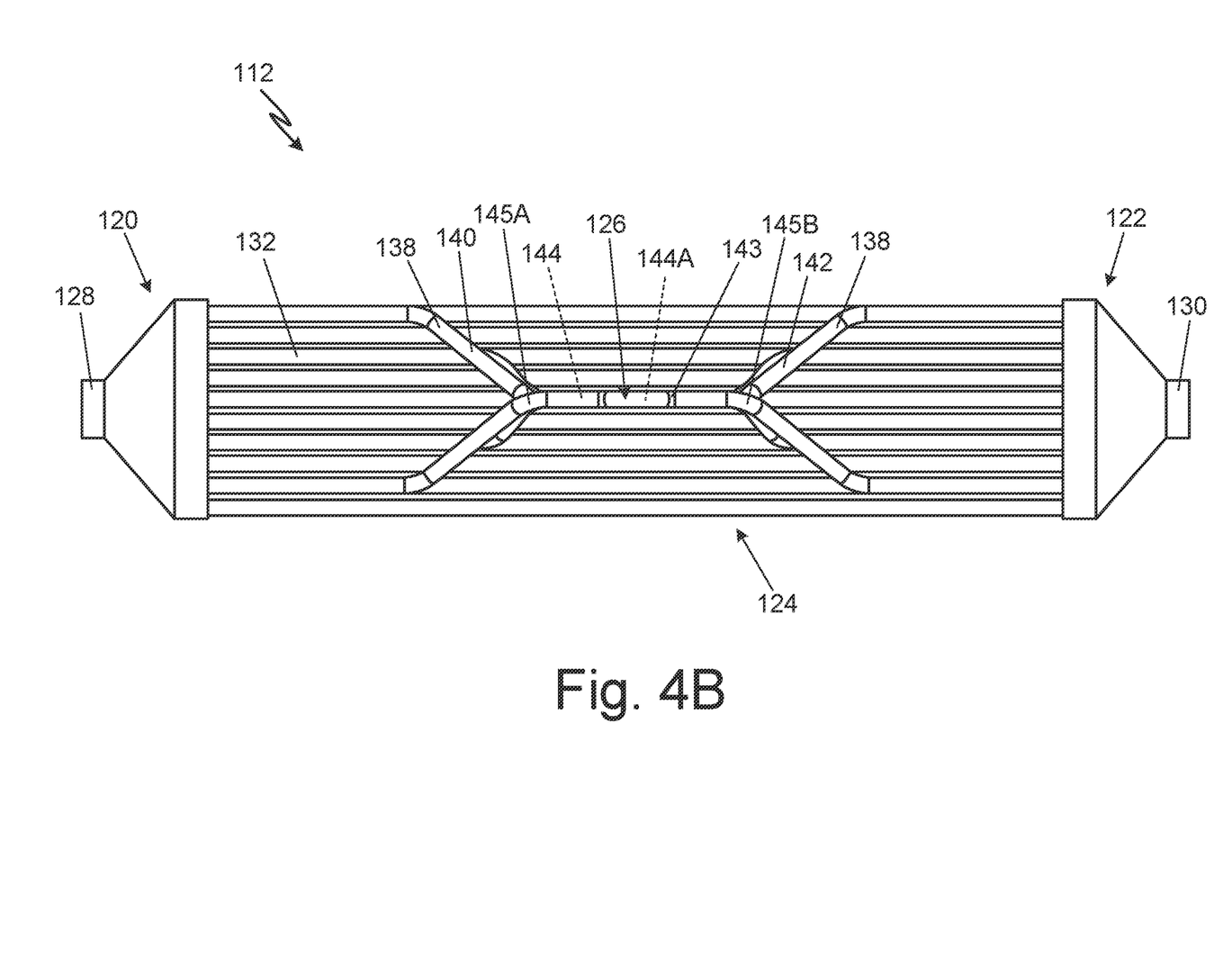
FIG. 4B is a top view of the second example of the heat exchanger.
Figure 4C:
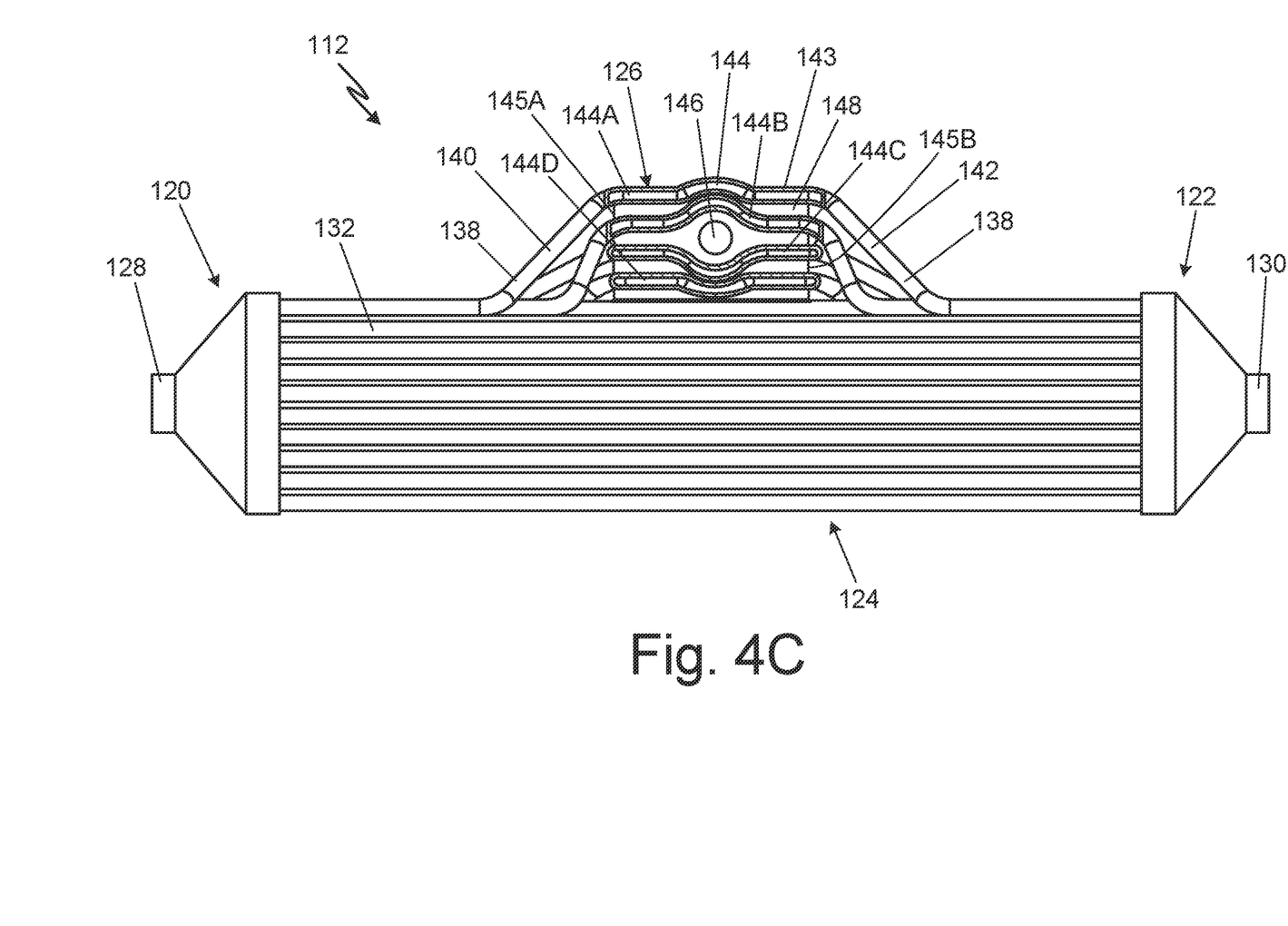
FIG. 4C is a partial cross-sectional side view of the second example of the heat exchanger showing details of the multiple internal flow passages of the mount structure.
Figure 5:
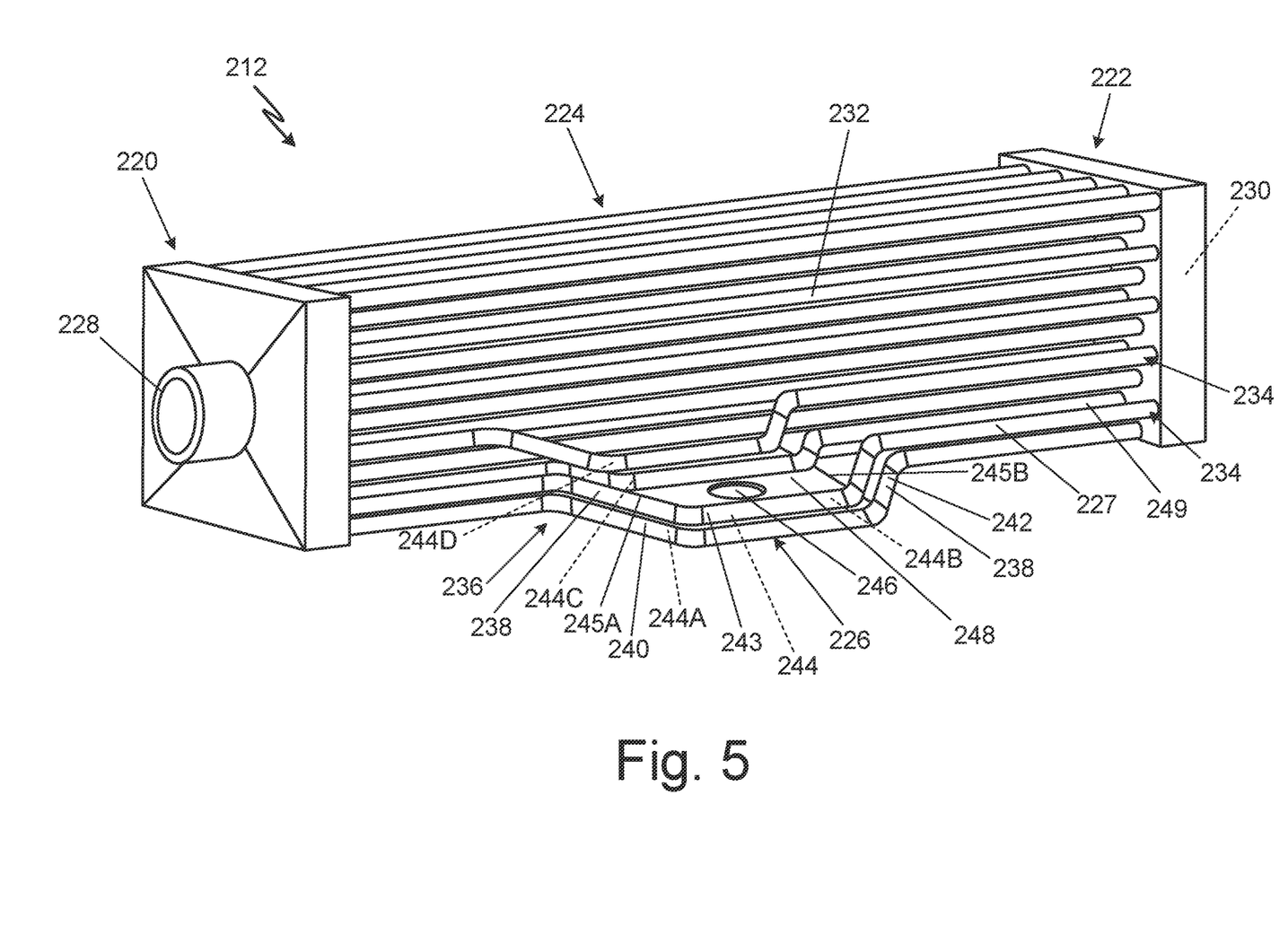
FIG. 5 is an isometric view of a third example of a heat exchanger including a mount structure with multiple internal flow passages that are connected to diverted tubes arising from multiple core layers.

Several examples of heat exchangers including mount structures according to techniques of this disclosure will be described with reference to FIGS. 3A-6B. Each heat exchanger example shown in FIGS. 3A-6B includes several generally similar components, which share the same name and which are identified by shared reference numbers that are increased incrementally between groups of FIGS. 3A-6B (e.g., FIGS. 3A-3C include heat exchanger 12; FIGS. 4A-4C include heat exchanger 112; FIG. 5 includes heat exchanger 212; and FIGS. 6A-6B include heat exchanger 312). For case of discussion, details of some components of the heat exchanger examples shown in FIGS. 3A-6B may not be repeated in each of the following sections, but it should be understood that the heat exchanger examples shown in FIGS. 3A-6B can include all or any combination of the components and features described herein. Although depicted in FIGS. 3A-6B as separate examples, a heat exchanger including a mount structure according to techniques of this disclosure can generally include any combination of the following features. Additionally, although each of the heat exchanger examples shown in FIGS. 3A-6B includes a single mount structure, the same concepts can be applied to heat exchangers with multiple mount structures and are not intended to be limited to implementations with only one mount structure. Moreover, one heat exchanger could also include multiple mount structures based on a combination of the different examples described herein.

Figure 3A:
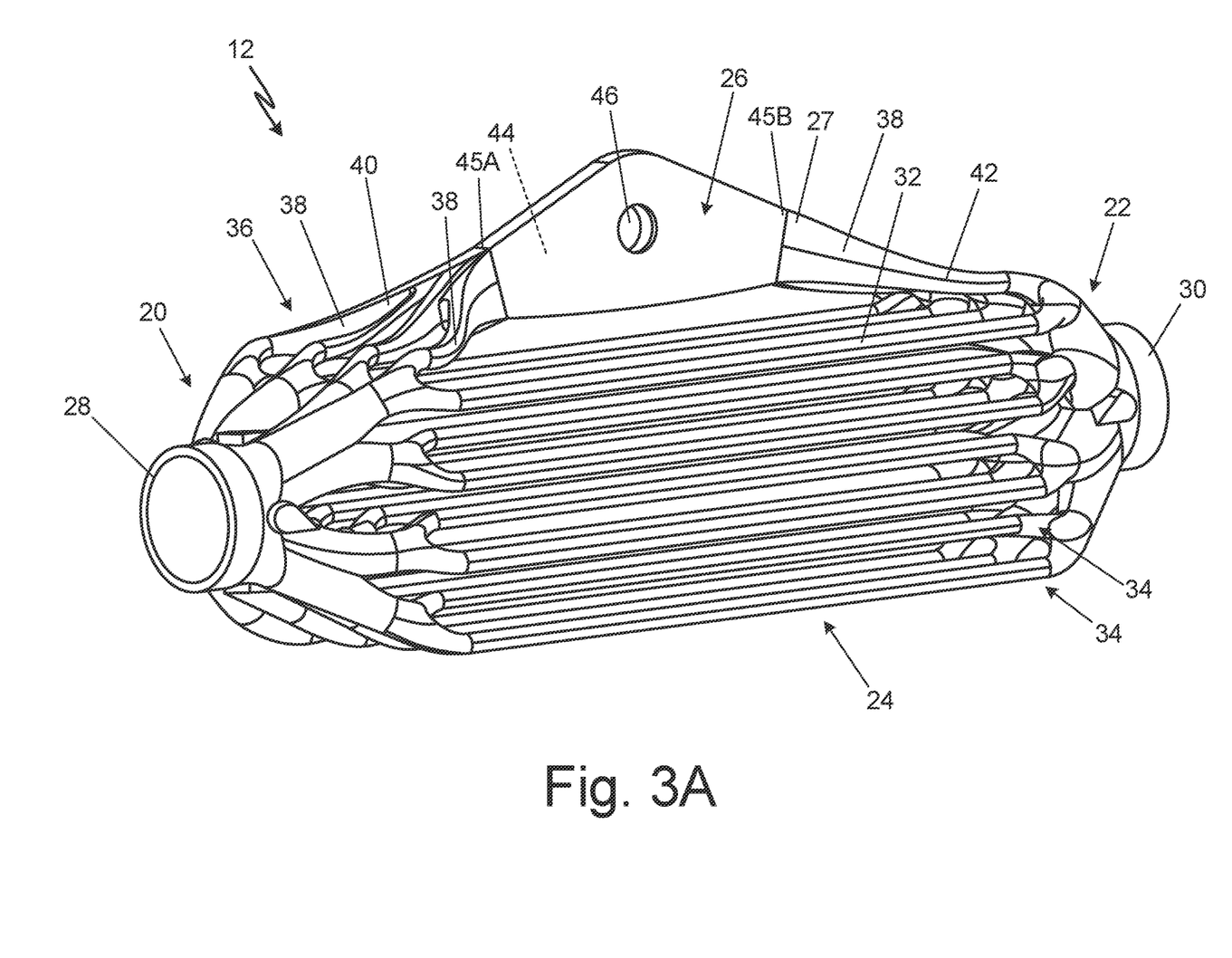
FIG. 3A is an isometric view of a first example of a heat exchanger including a mount structure with a common plenum internal flow passage.
Figure 3B:
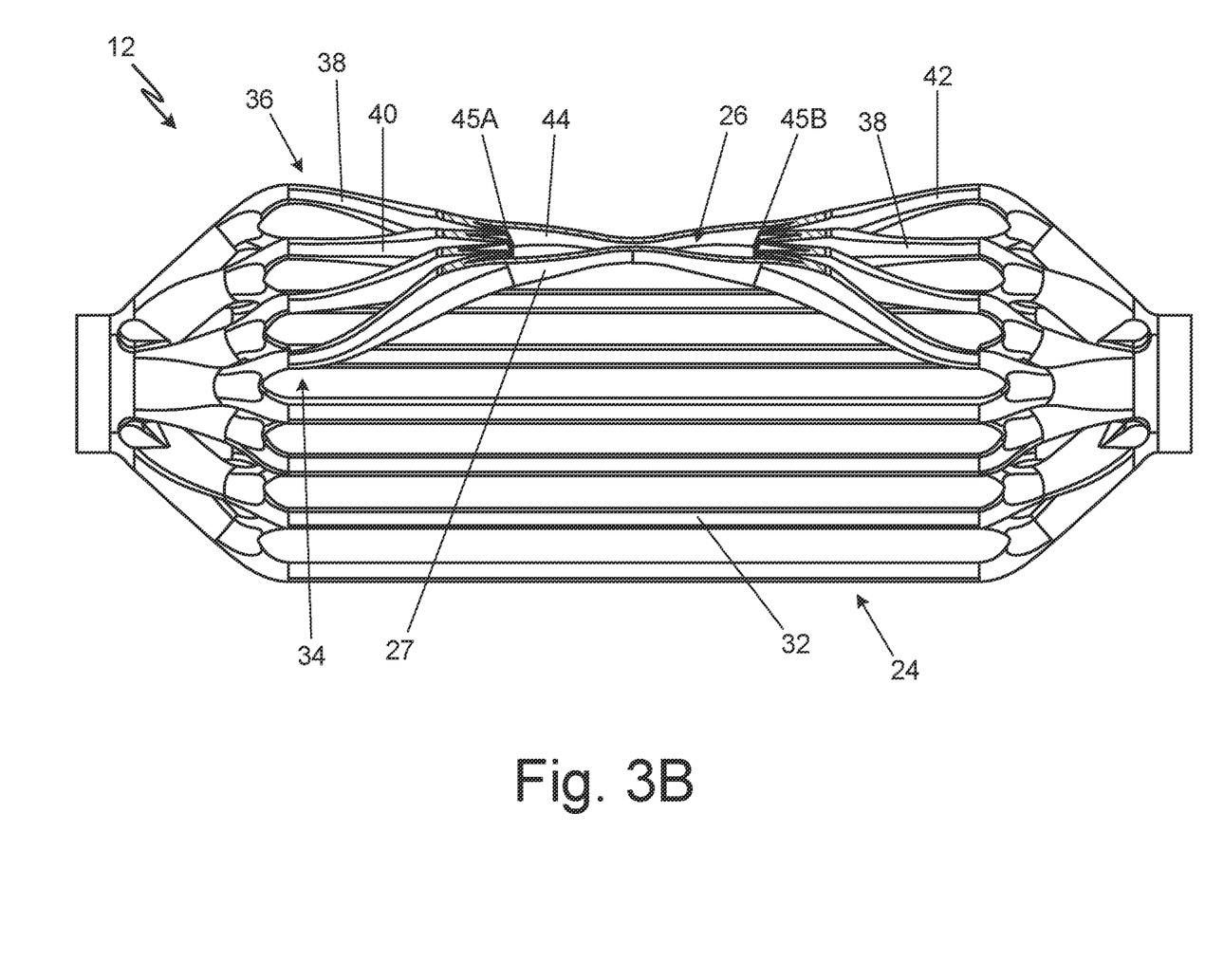
FIG. 3B is a partial cross-sectional view of the first example of the heat exchanger showing details of the common plenum internal flow passage of the mount structure.
Figure 3C:
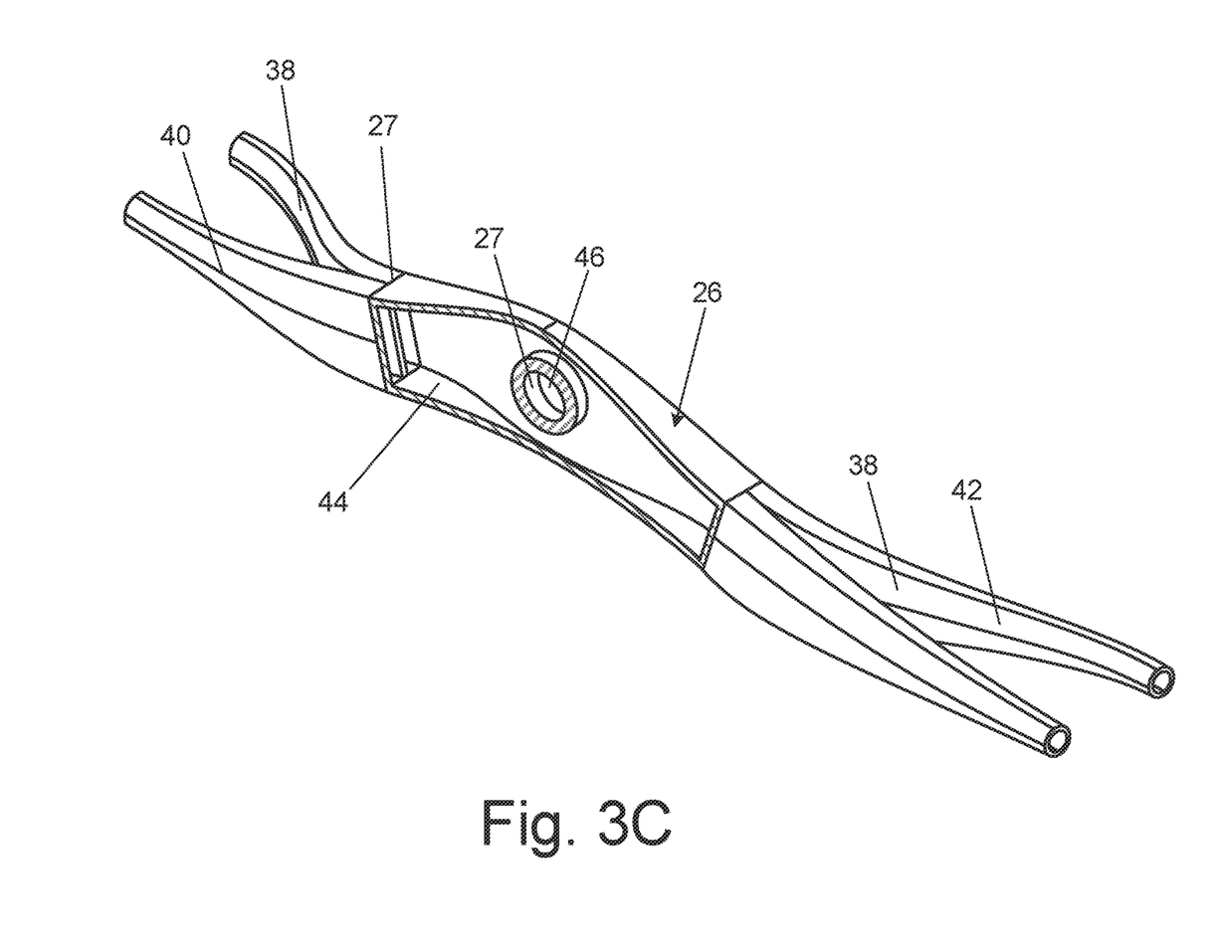
FIG. 3C is a partial cross-sectional view of the mount structure and connected diverted tubes of FIG. 3A in isolation.

FIG. 3A is an isometric view of heat exchanger 12 including mount structure 26 with common plenum internal flow passage 44. FIG. 3B is a partial cross-sectional view of heat exchanger 112 showing details of common plenum internal flow passage 44 of mount structure 26. FIG. 3C is a partial cross-sectional view of mount structure 26 and connected diverted tubes 38 in isolation. FIGS. 3A-3C will be described together. FIGS. 3A-3C show heat exchanger 12 including first header 20, second header 22, core 24, mount structure 26, and exterior surface 27. First header 20 includes fluid inlet 28, and second header 22 includes fluid outlet 30. Core 24 includes core tubes 32, layers 34, and subset group of tubes 36, which includes diverted tubes 38. Diverted tubes 38 include respective first portions 40 and second portions 42. Mount structure 26 includes internal flow passage 44, first end 45A, second end 45B, and opening 46.

First header 20, second header 22, core 24, mount structure 26, exterior surface 27, fluid inlet 28, fluid outlet 30, and core tubes 32 of heat exchanger 12 are described above with reference to FIGS. 1-2.

As illustrated in FIG. 3A, core tubes 32 of core 24 are arranged in layers 34. For example, FIG. 3A shows eight layers 34 stacked vertically to form core 24. In other examples, heat exchanger 12 can include more or fewer layers 34. Each of layers 34 includes one or more core tubes 32. In some examples, each of layers 34 can include the same number of core tubes 32. For example, FIG. 3A shows each of layers 34 includes four core tubes 32. In other examples, layers 34 can have different numbers of core tubes 32.

Core 24 also includes subset group of tubes 36. Subset group of tubes 36 is a subset of individual core tubes 32 that are connected to mount structure 26. Subset group of tubes 36 includes diverted tubes 38. Diverted tubes 38 are individual ones of core tubes 32 that are connected to mount structure 26. That is, diverted tubes 38 are diverted to mount structure 26 and remaining core tubes 32 form a non-diverted portion of core 24. For example, FIG. 3A shows four core tubes 32 are diverted tubes 38. In other examples, there can be more or fewer diverted tubes 38 in subset group of tubes 36. Additionally, FIG. 3A shows that subset group of tubes 36 includes diverted tubes 38 which are core tubes 32 from the same layer 34. Alternatively, subset group of tubes 36 can include core tubes 32 from different layers 34 (e.g., as shown in FIG. 5 and described in greater detail below). Diverted tubes 38 can be integrally formed with mount structure 26.

Mount structure 26 is hollow and includes internal flow passage 44. Internal flow passage 44 is a common plenum (also referred to herein as "common plenum internal flow passage 44") through which a fluid (e.g., the first fluid described above with reference to FIGS. 1-2) can flow. Internal flow passage 44 provides flow communication through mount structure 26 between first header 20 and second header 22. Mount structure 26 extends from first (or relatively upstream) end 45A to second (or relatively downstream) end 45B. Internal flow passage 44 also extends from first end 45A to second end 45B within mount structure 26. Diverted tubes 38 join with mount structure 26 so that each diverted tube 38 is connected to internal flow passage 44 of mount structure 26. More specifically, each diverted tube 38 converges into first end 45A and reemerges from second end 45B of mount structure 26 and common plenum internal flow passage 44. Diverted tubes 38 are connected at first end 45A and second end 45B of mount structure 26 and internal flow passage 44 to permit fluid to flow from upstream to downstream along a flow path (e.g., internal fluid flow path F1 as shown in FIGS. 1-2) through an interior of mount structure 26.

Each diverted tube 38 includes a respective first portion 40 upstream of mount structure 26 and a respective second portion 42 downstream of mount structure 26. As shown in FIGS. 3A-3B, first portions 40 of diverted tubes 38 converge into first end 45A of mount structure 26 and common plenum internal flow passage 44. Corresponding second portions 42 of diverted tubes 38 reemerge from second end 45B of mount structure 26 and common plenum internal flow passage 44. As shown in FIG. 3A, ones of diverted tubes 38 can be separated or spaced apart from adjacent diverted tubes 38 at respective first portions 40 and respective second portions 42.

Mount structure 26 can include opening 46. Opening 46 is an opening for engaging a portion of external mount 14 (shown in FIGS. 1-2) or another attachment mechanism so that heat exchanger 12 can be mounted in a heat exchange system (e.g., heat exchange system 10 shown in FIGS. 1-2). Opening 46 can be sized to fit with a corresponding attachment mechanism. Opening 46 extends through mount structure 26. As shown in cross-section in FIG. 3C, opening 46 is bounded by a portion of exterior surface 27 such that internal flow passage 44 of mount structure 44 is formed around opening 46.

In operation, portions of a fluid flowing through heat exchanger 12 are diverted to pass though mount structure 26. That is, portions of the fluid flowing through heat exchanger 12 from first header 20 through diverted tubes 38 of subset group of tubes 36 will pass through first portions 40, into and through common plenum internal flow passage 44 of mount structure 26, and out through second portions 42 to second header 22. Accordingly, the portions of the fluid that flow through diverted tubes 38 are merged into common plenum internal flow passage 44. The portions of the fluid are merged in internal flow passage 44 at first end 45A of mount structure 26 where fluid enters from first portions 40. The merged fluid flowing through internal flow passage 44 will flow around opening 46. The merged fluid flowing through internal flow passage 44 will then diverge back into second portions 42 of diverted tubes 38 at second end 45B of mount structure 26. Internal flow passage 44 is integrally formed with diverted tubes 38 of subset group of tubes 36 such that internal flow passage 44 is in flow communication with first header 20 and second header 22. Fluid flowing through heat exchanger 12 flows from first header 20 through a main portion of core 24 to second header 22 and also along a parallel portion of the flow path from first header 20 through diverted tubes 38 and mount structure 26 to second header 22. As such, first header 20, second header 22, core 24, and mount structure 26 are all in flow communication. Fluid flow through internal flow passage 44 of mount structure 26 is in parallel to fluid flow through the rest (or a non-diverted portion) of core 24.

Heat exchanger 12 utilizes internal flow passage 44 through mount structure 26 to reduce thermal gradients across mount structure 26. By passing internal fluid flow through internal flow passage 44 of mount structure 26, mount structure 26 is able to maintain a more uniform temperature with the rest of heat exchanger 12. Internal fluid flow passing through internal flow passage 44 of mount structure 26 also helps stabilize mount structure 26 at an operating temperature more rapidly, reducing the loads experienced during thermal transient conditions. Mount structure 26 including internal flow passage 44 can have reduced thermal stress in areas where mount structure 26 is attached to core 24. Generally, mount structure 26 can have a faster response to thermal transients and can also be more tolerant of high temperature external flow compared to traditional heat exchanger mounts that do not include internal flow passages.

Moreover, mount structure 26 including internal flow passage 44 provides additional heat exchange surface for increased heat transfer by heat exchanger 12. Integrally forming mount structure 26 with diverted tubes 38 from core 24 also results in heat exchanger 12 having improved packaging for fitment into more compact spaces. Heat exchanger 12 therefore balances structural, thermal, and packing requirements for effective heat exchange.

Additionally, because fluid flowing through diverted tubes 38 is combined into common plenum internal flow passage 44 and then separated again, heat exchanger 12 including mount structure 26 with common plenum internal flow passage 44 can have improved fluid mixing characteristics, which can provide different overall heat exchanger thermodynamic performance that may be desirable for certain implementations.

FIG. 4A is an isometric view of heat exchanger 112 including mount structure 126 with multiple internal flow passages 144. FIG. 4B is a top view of heat exchanger 112. FIG. 4C is a partial cross-sectional side view of heat exchanger 112 showing details of the multiple internal flow passages 144 of mount structure 126. FIGS. 4A-4C will be described together. FIGS. 4A-4C show heat exchanger 112 including first header 120, second header 122, core 124, mount structure 126, and exterior surface 127. First header 120 includes fluid inlet 128, and second header 122 includes fluid outlet 130. Core 124 includes core tubes 132, layers 134, and subset group of tubes 136, which includes diverted tubes 138. Diverted tubes 138 include respective first portions 140, second portions 142, and third portions 143. Mount structure 126 includes internal flow passages 144 (including individual tubular passages 144A-144D), first end 145A, second end 145B, opening 146, and free mount surface 148. FIG. 4A also shows free mount surface width W, third portion diameter D, core tube length L1, and diverted tube length L2.

Heat exchanger 112 has a generally similar structure, design, and function to heat exchanger 12 described above with reference to FIGS. 1-3C, except mount structure 126 includes multiple internal flow passages 144 instead of common plenum internal flow passage 44 (as shown in FIGS. 3A-3C).

As shown in FIGS. 4A-4C, mount structure 126 includes multiple internal flow passages 144. Internal flow passages 144 include individual tubular passages 144A-144D. FIGS. 4A-4C show four individual tubular passages 144A-144D; however, it should be understood that other examples can include more or fewer individual tubular passages. For example, the number of individual tubular passages can be selected to minimize the surface area of mount structure 126 that corresponds to free mount surface 148 and to maximize the surface area of mount structure 126 that corresponds to the individual tubular passages.

A fluid (e.g., the first fluid described above with reference to FIGS. 1-2) can flow through individual tubular passages 144A-144D of internal flow passages 144. Individual tubular passages 144A-144D of internal flow passages 144 provide flow communication through mount structure 126 between first header 120 and second header 122. Mount structure 126 extends from first (or relatively upstream) end 145A to second (or relatively downstream) end 145B. Individual tubular passages 144A-144D of internal flow passages 144 also extend from first end 145A to second end 145B within mount structure 126. Diverted tubes 138 join with mount structure 126 so that each diverted tube 138 is connected to a corresponding individual tubular passage 144A-144D of internal flow passages 144. Diverted tubes 138 are connected at first end 145A and second end 145B of mount structure 126 and individual tubular passages 144A-144D to permit fluid to flow from upstream to downstream along a flow path (e.g., internal fluid flow path F1 as shown in FIGS. 1-2) through an interior of mount structure 126.

Each diverted tube 138 includes a respective first portion 140 upstream of mount structure 126, a respective second portion 142 downstream of mount structure 126, and a respective third portion 143 that extends through mount structure 126 as a corresponding individual tubular passage 144A-144D of internal flow passages 144. That is, respective first portions 140 and second portions 142 are connected to opposite ends of respective third portions 143. Each third portion 143 is one of individual tubular passages 144A-144D. Flow passages through diverted tubes 138 are continuous from first portions 140, through third portions 143 (as individual tubular passages 144A-144D of mount structure 126), and through second portions 142. Flow passages through diverted tubes 138 remain separate within mount structure 126 as individual tubular passages 144A-144D, rather than merging into a common plenum (e.g., as shown in FIGS. 3A-3C). As shown in FIGS. 4A and 4C, ones of diverted tubes 138 can be separated or spaced apart from adjacent diverted tubes 138 at respective first portions 140 and respective second portions 412. However, each diverted tube 138 is connected to adjacent diverted tubes 138 at respective third portions 143 by free mount surface 148 extending between respective third portions 143 of adjacent diverted tubes 138.

Free mount surface 148 encompasses the portions of mount structure 126 that do not have internal flow passages 144 passing through. Free mount surface 148 includes the structural portions of mount structure 126 that span between third portions 143 of diverted tubes 138 as they extend through mount structure 126. As shown in FIG. 4A, free mount surface 148 has width W. Third portions 143 of diverted tubes 138 also have diameter D as measured in the same direction as width W. In some examples, free mount surface width W is less than diameter D of third portions 143 (i.e., free mount surface 148 is narrower than third portions 143) so that individual tubular passages 144A-144D retain the individual tubular characteristics of core tubes 132. In other examples, free mount surface width W and diameter D can have any suitable relative dimensions.

Mount structure 126 can also include opening 146. Opening 146 is an opening for engaging a portion of external mount 14 (shown in FIGS. 1-2) or another attachment mechanism so that heat exchanger 112 can be mounted in a heat exchange system (e.g., heat exchange system 10 shown in FIGS. 1-2). Opening 146 can be sized to fit with a corresponding attachment mechanism. Opening 146 extends through mount structure 126. As is most easily viewed in FIG. 4C, individual tubular passages 144A-144D of internal flow passages 144 (and corresponding third portions 143 of diverted tubes 138) are routed around opening 146. In some examples, individual tubular passages 144A-144D and corresponding third portions 143 can be curved or contoured around opening 146. For example, FIG. 4C shows each of individual tubular passages 144A-144D is curved, and individual tubular passages 144B and 144C are more significantly curved than individual tubular passages 144A and 144D. In other examples, individual tubular passages 144A-144D and corresponding third portions 143 can be sufficiently spaced away from opening 146 to have straight paths through mount structure 126.

As shown in FIG. 4A, core tubes 132 that are not diverted to mount structure 126 have length L1. Diverted tubes 138 of subset group of tubes 136 have length L2. In general, diverted tubes 138 of subset group of tubes 136 can be longer than the remaining core tubes 132 that are not diverted to mount structure 126, i.e., length L2 can be greater than length L1. Length L2 of diverted tubes 138 can be greater than length L1 of remaining core tubes 132 because diverted tubes 138 turn at some point along their length toward mount structure 126, rather than following the shortest path from first header 120 to second header 122. Diverted tubes 138 may also be angled away from the remaining core tubes 132 depending on the arrangement of internal flow passages 144 through mount structure 126.

In operation, portions of a fluid flowing through heat exchanger 112 are diverted to pass though mount structure 126. That is, portions of the fluid flowing through heat exchanger 112 from first header 120 through diverted tubes 138 of subset group of tubes 136 will pass through first portions 140, into and through third portions 143 at mount structure 126, and out through second portions 142 to second header 122. The portions of fluid remain separated in individual tubular passages 144A-144D of internal flow passages 144 (i.e., within third portions 143). Internal flow passages 144 are integrally formed with diverted tubes 138 of subset group of tubes 136 such that internal flow passages 144 are in flow communication with first header 120 and second header 122. Fluid flowing through heat exchanger 112 flows from first header 120 through a main portion of core 124 to second header 122 and also along a parallel portion of the flow path from first header 120 through diverted tubes 138 and mount structure 126 to second header 122. As such, first header 120, second header 122, core 124, and mount structure 126 are all in flow communication. Fluid flow through internal flow passages 144 of mount structure 26 is in parallel to fluid flow through the rest (or a non-diverted portion) of core 124.

In addition to the overall heat exchange benefits described above with respect to FIG. 3A-3C, diverted tubes 138 routed through mount structure 126 can provide additional heat exchanging capacity because diverted tubes 138 are longer than other core tubes 132 and therefore have more surface area available for heat transfer. Moreover, the longer, straighter segments of diverted tubes 138 are relatively strong so as to be suitable for durably connecting to mount structure 126 away from the remaining core tubes 132.

FIG. 5 is an isometric view of heat exchanger 212 including mount structure 226 with multiple internal flow passages 244 that are connected to diverted tubes 238 arising from multiple core layers 234. FIG. 5 shows heat exchanger 212 including first header 220, second header 222, core 224, mount structure 226, and exterior surface 227. First header 220 includes fluid inlet 228, and second header 222 includes fluid outlet 230. Core 224 includes core tubes 232, layers 234, and subset group of tubes 236, which includes diverted tubes 238. Diverted tubes 238 include respective first portions 240, second portions 242, and third portions 243. Mount structure 226 includes internal flow passages 244 (including individual tubular passages 244A-244D), first end 245A, second end 245B, opening 246, and free mount surface 248. Also labeled in FIG. 5 is inward tube 249.

Heat exchanger 212 has a generally similar structure, design, and function to heat exchanger 112 described above with reference to FIGS. 4A-4C, except diverted tubes 238 arise from multiple core layers 234 rather than from a single core layer 34 or 134, as shown in FIGS. 3A-4C. That is, subset group of tubes 236 includes a subset of individual core tubes 232 from multiple layers 234 in core 224. In the example shown in FIG. 5, diverted tubes 238 of subset group of tubes 236 are ones of core tubes 232 arising from three different layers 234. Specifically, the example shown in FIG. 5 shows four diverted tubes 238, three of which arise from different layers 234, along with inward tube 249, which is one of diverted tubes 238 that arises from the same layer 234 as another diverted tube 238 but from a laterally inward position within the same layer 234. It should be understood, however, that numerous other examples are possible with different combinations of core tubes 232 and layers 234 making up subset group of tubes 236. In general, any combination of core tubes 232 in any layers 234 can be routed to mount structure 226 as diverted tubes 238. For example, subset group of tubes 236 can include ones of core tubes 232 that are configured to be positioned proximate to an external mount (e.g., external mount 14 shown in FIGS. 1-2) when heat exchanger 212 is installed in a heat exchange system (e.g., heat exchange system 10 shown in FIGS. 1-2). The position of an external mount or other structure may dictate the corresponding position of mount structure 226 with respect to the rest of heat exchanger 212 and therefore determine the ones of core tubes 232 that will be nearest to mount structure 226. Even more generally, mount structure 226 can be positioned in any orientation with respect to core 224 and the rest of heat exchanger 212. As shown in FIG. 5, diverted tubes 238 are ones of core tubes 232 that are proximate mount structure 226.

In addition to the overall heat exchange benefits described above with respect to FIG. 3A-3C, diverted tubes 238 routed through mount structure 226 that arise from multiple core layers 234 allow heat exchanger 212 to have more flexible design options for connecting core tubes 232 to mount structure 226. In this way, heat exchanger 212 including mount structure 226 and diverted tubes 238 can be implemented in spaces where structural implications would otherwise make it difficult to route fluid flow to the location where the mount structure needs to be positioned, such as compact or irregularly shaped spaces. Additionally, including inward tube 249 (or multiple core tubes 232 that are positioned more interiorly) in subset group of tubes 236 can improve the strength of mount structure 226 while maintaining heat exchange benefits from internal flow passages 244. To some extent, including inward tube 249 in subset group of tubes 236 may also further reduce the thermal gradient experienced by mount structure 226. The ability to utilize core tubes 232 from different layers 234 or different lateral positions within core 224 in subset group of tubes 236 makes the thermodynamics of mount structure 226 tunable for different implementations of heat exchanger 212.

Figure 6A:
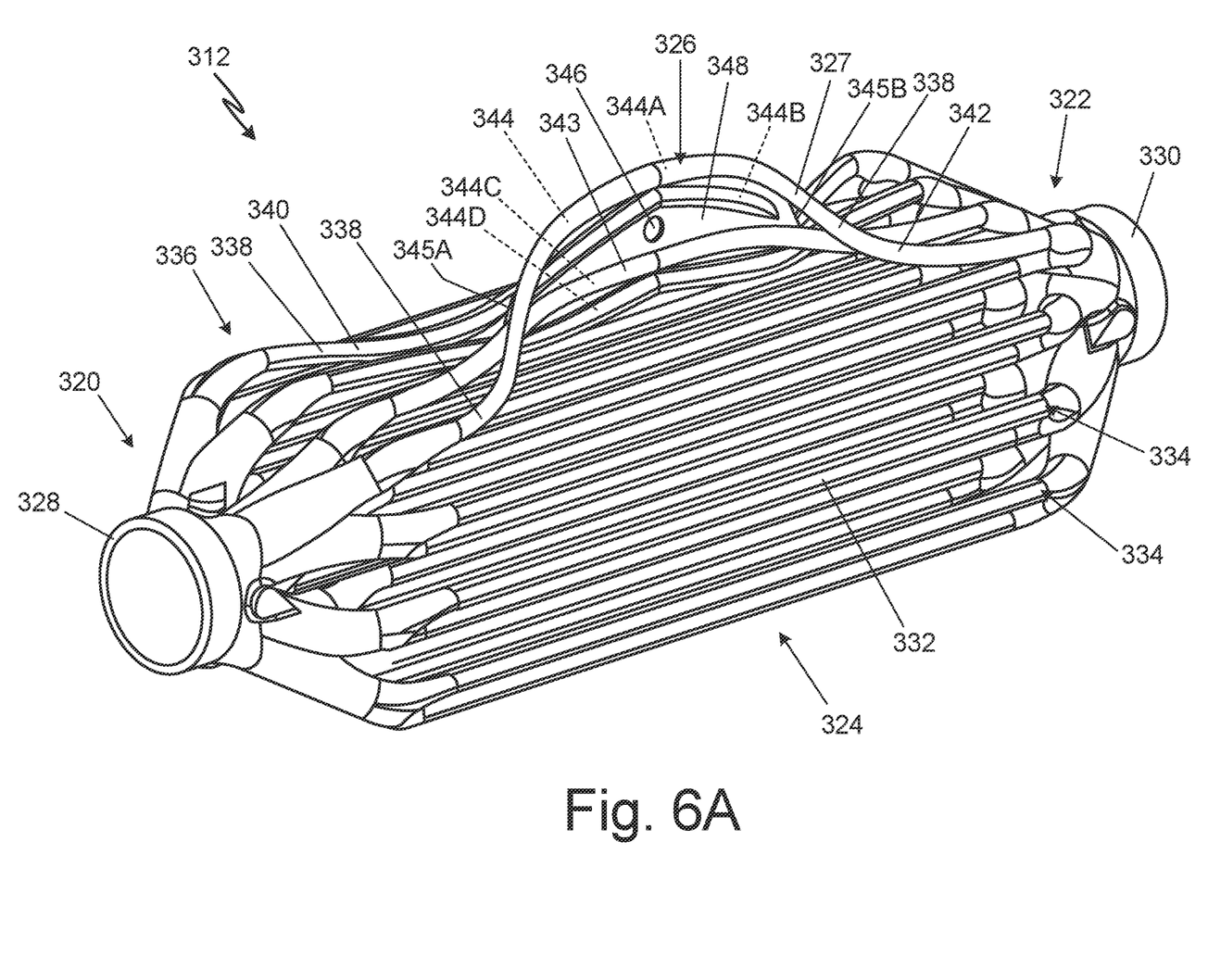
FIG. 6A is an isometric view of a fourth example of a heat exchanger including a mount structure with multiple internal flow passages and contoured diverted tubes connected to the mount structure.
Figure 6B:
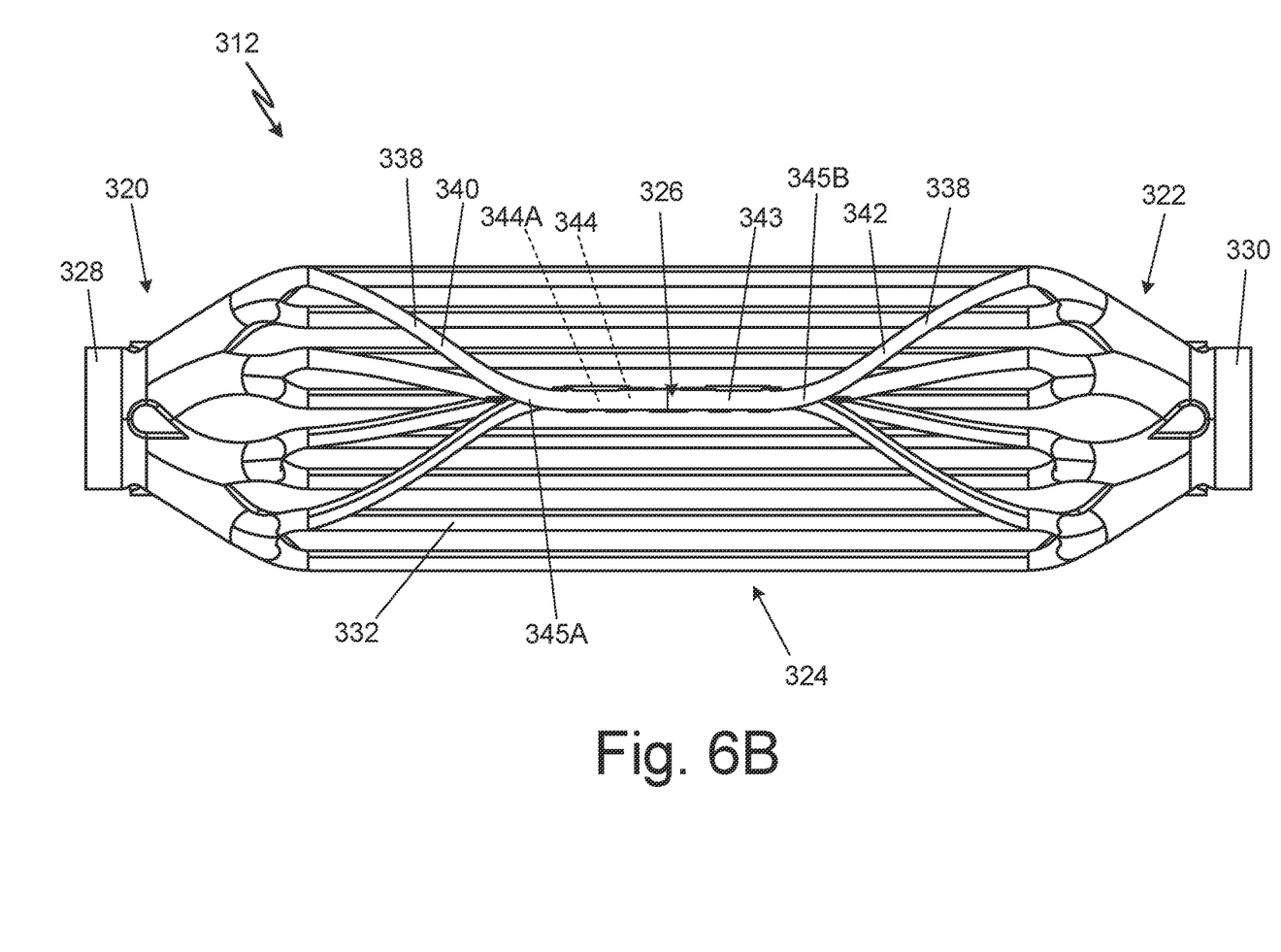
FIG. 6B is a top view of the fourth example of the heat exchanger.

FIG. 6A is an isometric view of heat exchanger 312 including mount structure 326 with multiple internal flow passages 344 and contoured diverted tubes 338 connected to mount structure 326. FIG. 6B is a top view of the fourth example of the heat exchanger. FIGS. 6A-6B will be described together. FIGS. 6A-6B show heat exchanger 312 including first header 320, second header 322, core 324, mount structure 326, and exterior surface 327. First header 320 includes fluid inlet 328, and second header 322 includes fluid outlet 330. Core 324 includes core tubes 332, layers 334, and subset group of tubes 336, which includes diverted tubes 338. Diverted tubes 338 include respective first portions 340, second portions 342, and third portions 343. Mount structure 326 includes internal flow passages 344 (including individual tubular passages 344A-344D), first end 345A, second end 345B, opening 346, and free mount surface 348.

Heat exchanger 312 has a generally similar structure, design, and function to heat exchanger 112 described above with reference to FIGS. 4A-4C, except diverted tubes 338 are contoured. As shown in FIGS. 6A-6B, first portions 340 of diverted tubes 338 are contoured along the length from first header 320 to mount structure 326. Likewise, second portions 342 of diverted tubes 338 are also contoured along the length from mount structure 326 to second header 330. This contrasts with diverted tubes 138 shown in FIGS. 4A-4C, which have a turn between two straight segments in each of first portions 140 and second portions 142. In some examples, first portions 340 and second portions 342 are contoured along the entire segment. In other examples, either first portions 340 or second portions 342 can be contoured and the other can have straight segments.

Like diverted tubes 238 arising from multiple core layers 234 described above with reference to FIG. 5, contoured diverted tubes 338 also allow heat exchanger 312 to have more flexible design options for connecting core tubes 332 to mount structure 326. In this way, heat exchanger 312 including mount structure 326 and contoured diverted tubes 338 can be implemented in spaces where structural implications would otherwise make it difficult to route fluid flow to the location where the mount structure needs to be positioned, such as compact or irregularly shaped spaces.

Discussion of Possible Embodiments

The following are non-exclusive descriptions of possible embodiments of the present invention.

A heat exchanger includes a first header including a fluid inlet and a second header positioned downstream of the first header with respect to a first flow path of a first fluid and including a fluid outlet. The heat exchanger further includes a core extending from the first header to the second header and a mount structure extending between the first header and the second header. The core includes a plurality of core tubes. The mount structure is integrally formed with a subset group of diverted tubes of the plurality of core tubes and includes one or more internal flow passages that are connected to the subset group of diverted tubes such that the one or more internal flow passages are in flow communication with the first header and the second header in parallel to a non-diverted portion of the core.

The heat exchanger of the preceding paragraph can optionally include, additionally and/or alternatively, any one or more of the following features, configurations and/or additional components:

The one or more internal flow passages can include a common plenum within the mount structure that is connected to each tube of the subset group of diverted tubes such that portions of the first fluid flowing through the subset group of diverted tubes are merged in the common plenum.

Each tube of the subset group of diverted tubes can converge into a first end of the common plenum and reemerge from a second end of the common plenum such that each tube of the subset group of diverted tubes includes a first portion upstream of the mount structure and a second portion downstream of the mount structure.

Each tube of the subset group of diverted tubes can be separated from adjacent tubes of the subset group of diverted tubes at a respective first portion and a respective second portion.

The one or more internal flow passages can include individual tubular passages that are each connected to a corresponding tube of the subset group of diverted tubes such that each tube of the subset group of diverted tubes includes a first portion upstream of the mount structure, a second portion downstream of the mount structure, and a third portion that extends through the mount structure as a corresponding individual tubular passage of the one or more internal flow passages.

Each tube of the subset group of diverted tubes can be separated from adjacent tubes of the subset group of diverted tubes at a respective first portion and a respective second portion; and each tube of the subset group of diverted tubes can be connected to the adjacent tubes of the subset group of diverted tubes by free mount surface extending between respective third portions of each tube of the subset group of diverted tubes.

The free mount surface can have a width that is less than a diameter of the third portion of each tube of the subset group of diverted tubes.

Each tube of the subset group of diverted tubes can be longer than remaining tubes of the plurality of core tubes.

Each of the individual tubular passages of the mount structure can be routed around an opening through the mount structure.

The first or second portion of each tube of the subset group of diverted tubes can be contoured.

The subset group of diverted tubes can include individual core tubes from a same layer in the core.

The subset group of diverted tubes can include individual core tubes from multiple layers in the core.

The subset group of diverted tubes can include individual core tubes that are configured to be positioned proximate to an external mount when the heat exchanger is installed in a heat exchange system.

The heat exchanger including the mount structure can be configured to be additively manufactured as a single, monolithic unit.

At least one of the first header and the second header can be a fractal header.

At least one of the first header and the second header can include a consecutively branching tubular structure terminating in individual tubes that are continuous with corresponding ones of the plurality of core tubes.

The first header can be configured to receive the first fluid via the fluid inlet and the second header can be configured to discharge the first fluid via the fluid outlet; and an exterior surface of the heat exchanger can be exposed to a second fluid in a crossflow arrangement.

The first fluid and the second fluid can have different temperatures.

A heat exchanger includes a first header including a fluid inlet and a second header positioned downstream of the first header with respect to a first flow path of a first fluid and including a fluid outlet. The heat exchanger further includes a core extending from the first header to the second header and a mount structure positioned adjacent to the core. The core includes a plurality of core tubes. The mount structure is integrally formed with a subset group of diverted tubes of the plurality of core tubes and includes one or more internal flow passages that are connected to the subset group of diverted tubes such that the first flow path is diverted through the one or more internal flow passages of the mount structure.

A heat exchange system includes a heat exchanger and an external mount. The heat exchanger includes a first header including a fluid inlet and a second header positioned downstream of the first header with respect to a first flow path of a first fluid and including a fluid outlet. The heat exchanger further includes a core extending between the first header and the second header and a mount structure. The core includes a plurality of core tubes. The mount structure is integrally formed with a subset group of diverted tubes of the plurality of core tubes and includes one or more internal flow passages that are connected to the subset group of diverted tubes such that the one or more internal flow passages are in flow communication with the first header and the second header in parallel to a non-diverted portion of the core. The external mount is positioned along a second flow path of a second fluid and attached to the mount structure of the heat exchanger such that that heat exchanger is mounted in a crossflow arrangement with respect to the second flow path.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A heat exchanger comprising:
a first header including a fluid inlet;

a second header positioned downstream of the first header with respect to a first flow path of a first fluid and including a fluid outlet;

a core extending from the first header to the second header, the core comprising a plurality of core tubes; and a mount structure extending between the first header and the second header, the mount structure being integrally formed with a subset group of diverted tubes of the plurality of core tubes and including one or more internal flow passages that are connected to the subset group of diverted tubes such that the one or more internal flow passages are in flow communication with the first header and the second header in parallel to a non-diverted portion of the core.

2. The heat exchanger of claim 1, wherein the one or more internal flow passages include a common plenum within the mount structure that is connected to each tube of the subset group of diverted tubes such that portions of the first fluid flowing through the subset group of diverted tubes are merged in the common plenum.

3. The heat exchanger of claim 2, wherein each tube of the subset group of diverted tubes converges into a first end of the common plenum and reemerges from a second end of the common plenum such that each tube of the subset group of diverted tubes includes:
a first portion upstream of the mount structure; and
a second portion downstream of the mount structure.

4. The heat exchanger of claim 3, wherein each tube of the subset group of diverted tubes is separated from adjacent tubes of the subset group of diverted tubes at a respective first portion and a respective second portion.

5. The heat exchanger of claim 1, wherein the one or more internal flow passages include individual tubular passages that are each connected to a corresponding tube of the subset group of diverted tubes such that each tube of the subset group of diverted tubes includes:
a first portion upstream of the mount structure;
a second portion downstream of the mount structure; and
a third portion that extends through the mount structure as a corresponding individual tubular passage of the one or more internal flow passages.

6. The heat exchanger of claim 5, wherein each tube of the subset group of diverted tubes is separated from adjacent tubes of the subset group of diverted tubes at a respective first portion and a respective second portion; and wherein each tube of the subset group of diverted tubes is connected to the adjacent tubes of the subset group of diverted tubes by free mount surface extending between respective third portions of each tube of the subset group of diverted tubes.

7. The heat exchanger of claim 6, wherein the free mount surface has a width that is less than a diameter of the third portion of each tube of the subset group of diverted tubes.

8. The heat exchanger of claim 5, wherein each tube of the subset group of diverted tubes is longer than remaining tubes of the plurality of core tubes.

9. The heat exchanger of claim 5, wherein each of the individual tubular passages of the mount structure is routed around an opening through the mount structure.

10. The heat exchanger of claim 5, wherein the first or second portion of each tube of the subset group of diverted tubes is contoured.

11. The heat exchanger of claim 1, wherein the subset group of diverted tubes includes individual core tubes from a same layer in the core.

12. The heat exchanger of claim 1, wherein the subset group of diverted tubes includes individual core tubes from multiple layers in the core.

13. The heat exchanger of claim 1, wherein the subset group of diverted tubes includes individual core tubes that are configured to be positioned proximate to an external mount when the heat exchanger is installed in a heat exchange system.

14. The heat exchanger of claim 1, wherein the heat exchanger including the mount structure is configured to be additively manufactured as a single, monolithic unit.

15. The heat exchanger of claim 1, wherein at least one of the first header and the second header is a fractal header.

16. The heat exchanger of claim 1, wherein at least one of the first header and the second header includes a consecutively branching tubular structure terminating in individual tubes that are continuous with corresponding ones of the plurality of core tubes.

17. The heat exchanger of claim 1, wherein the first header is configured to receive the first fluid via the fluid inlet and the second header is configured to discharge the first fluid via the fluid outlet; and wherein an exterior surface of the heat exchanger is exposed to a second fluid in a crossflow arrangement.

18. The heat exchanger of claim 17, wherein the first fluid and the second fluid have different temperatures.

19. A heat exchanger comprising:
a first header including a fluid inlet;
a second header positioned downstream of the first header with respect to a first flow path of a first fluid and including a fluid outlet;
a core extending from the first header to the second header, the core comprising a plurality of core tubes; and
a mount structure positioned adjacent to the core, the mount structure being integrally formed with a subset group of diverted tubes of the plurality of core tubes and including one or more internal flow passages that are connected to the subset group of diverted tubes such that the first flow path is diverted through the one or more internal flow passages of the mount structure.

20. A heat exchange system comprising:
a heat exchanger comprising:
a first header including a fluid inlet;
a second header positioned downstream of the first header with respect to a first flow path of a first fluid and including a fluid outlet;
a core extending between the first header and the second header, the core comprising a plurality of core tubes; and
a mount structure that is integrally formed with a subset group of diverted tubes of the plurality of core tubes and that includes one or more internal flow passages connected to the subset group of diverted tubes such that the one or more internal flow passages are in flow communication with the first header and the second header in parallel to a non-diverted portion of the core; and
an external mount positioned along a second flow path of a second fluid and attached to the mount structure of the heat exchanger such that that heat exchanger is mounted in a crossflow arrangement with respect to the second flow path.

* * * * *